Feb. 25, 1958

M. REBUFFONI ET AL 2,825,004

ARC-WELDING APPARATUS

Filed March 15, 1955

WITNESSES
Edwin E. Bassler
Leon J. Taja

INVENTORS
Martin Rebuffoni
& Lewis F. Pettit, Jr.
BY
Hyman Diamond.
ATTORNEY

United States Patent Office 2,825,004
Patented Feb. 25, 1958

2,825,004

ARC-WELDING APPARATUS

Martin Rebuffoni, Williamsville, and Lewis F. Pettit, Jr., Kenmore, N. Y., assignors to Westinghouse Electric Corporation, East Pittsburgh, Pa., a corporation of Pennsylvania Application March 15, 1955, Serial No. 494,370

6 Claims. (Cl. 315—205)

Our invention relates to arc-welding apparatus and has particular relation to aparatus for welding both with alternating current and with direct current but concerns itself primarily with the portion of the apparatus for welding with direct current.

In direct current welding apparatus a rectifier, which is preferably of the full-wave type, is interposed between single-phase supply conductors and load conductors which are connected to the welding electrode and the work. Since the supply is of the single phase type, the potential and current derivable at the output terminals of the rectifier become substantially zero at the end of each half period of the supply. If the output terminals were directly connected to the load conductors, the welding arc would be extinguished on each occurrence of the zero current and difficulties would be involved in maintaining the arc.

The repeated occurrences of the zero current can be suppressed by connecting a reactor between one or the other of the output terminals of the rectifier and the load conductors. But the arc welding current is usually of the order of several hundred amperes and in accordance with the teachings of the prior art the reactor should be capable of conducting this current without becoming saturated. Such a reactor is large and costly and results in excessively massive and costly apparatus.

It is accordingly an object of our invention to provide a low-cost direct-current arc welder for delivering welding currents of the order of several hundred amperes.

Another object of our invention is to provide a low-cost direct-current arc welder of moderate dimensions adapted to be supplied from a single-phase alternating-current source and capable of delivering welding current of the order of several hundred amperes.

A more specific object of our invention is to provide a low-cost arc welder of moderate dimensions adapted to be supplied from a single-phase alternating-current source which shall include facilities for welding either with direct current or with alternating current.

Our invention arises from the realization that the reactor which suppresses the tendency of the arc to extinguish during each half period of the alternating-current supply need not be so large as to avoid saturation throughout the whole range of output of the apparatus from open circuit to the rated current magnitude. The welding arc may be maintained with a very small reactor because once the arc is ignited, only a relatively small current is required to maintain it. In accordance with our invention then, we provide in circuit with the rectifier and the load conductors a reactor of such small dimensions that it begins to saturate at a current magnitude of the order of 10 to 30 amperes. Thus we have found that highly satisfactory operation is achieved with welding apparatus in accordance with our invention rated for 200 amperes (a widely used rating) and having a reactor which begins to saturate at a current magnitude of the order of 20 amperes. In welding with our apparatus magnetic energy is stored in the reactor as just described so long as the welding current is so high that the reactor is saturated because with the reactor saturated the variation in flux through its core is small. When the welding current becomes so small that the reactor is unsaturated, the resulting flux variation produces a potential which tends to maintain the welding current by discharging of the stored energy. To assure that the desaturation starts for an adequately high current to maintain the arc the core of the reactor is provided with an air gap and the gap is set to give maximum energy transfer at this point.

The novel features that we consider characteristic of our invention are discussed generally above. Our invention itself, both as to its organization and its method of operation together with additional objects and advantages, will be understood from the following description of a specific embodiment, taken in connection with the accompanying drawing, in which.

Figure 1:
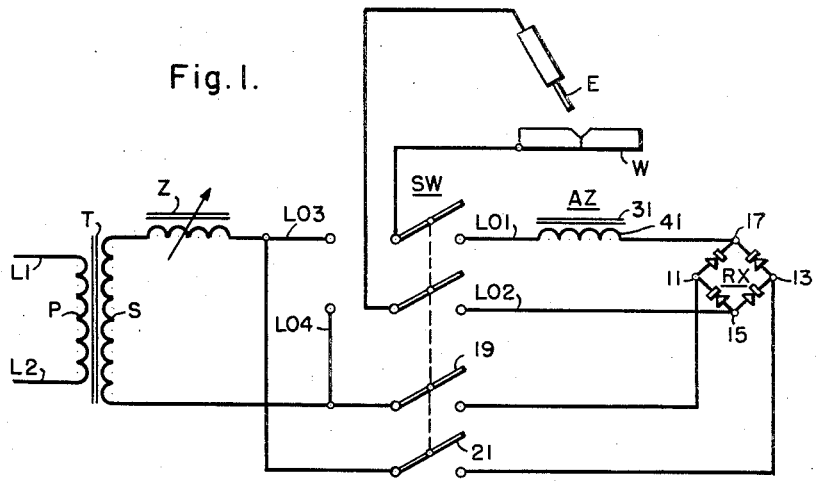
Figure 1 is a circuit diagram of welding apparatus in accordance with our invention.
Figure 2:
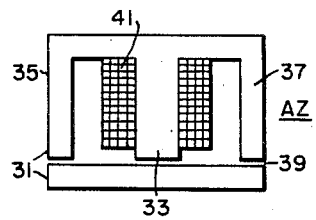
Fig. 2 is a diagram of a reactor used in the practice of our invention.

The apparatus shown in Figs. 1 and 2 includes facilities for welding with direct current and alternating current from a single phase alternating current source. The direct current is derived from a pair of load conductors LO1 and LO2 and the alternating current from another pair of load conductors LO3 and LO4. The load conductors LO1 and LO2 or LO3 and LO4 may be connected respectively to the electrode E and the work W selectively. For this purpose a switch SW is shown in Fig. 1. This showing is symbolical and may represent a plurality of ordinary jumpers which are frequently used in the practice of our invention. Since our invention in its specific aspects concerns itself with the direct current facilities, these will now be described and it will be assumed that the switch SW is closed in the right-hand position. The apparatus is supplied from single-phase alternating-current conductors L1 and L2 which may be connected through the usual disconnects (not shown) to commercial supply conductors capable of delivering 110, 220, 440, or even a higher voltage.

The apparatus also includes a supply transformer T having a primary P and a secondary S. While the primary P and secondary S are shown as simple two-terminal windings, they are in the customary practice of our invention provided with taps so that at the voltage impressed across the conductors L1 and L2 a predetermined open circuit voltage is available at the terminals of the secondary. Preferably, this voltage is of the order of 70 volts R. M. S.

The apparatus in accordance with our invention further includes a rectifier RX preferably of the full-wave bridge type. This rectifier RX may be composed of selenium cells. The cells must be adequate in number and dimensions to carry the rated current of the welder. The rectifier RX has input terminals 11 and 13 and output terminals 15 and 17. The secondary S is connected to the input terminals through a variable reactor Z which may be varied to adjust the welding current when the apparatus is in use and through the contacts 19 and 21 of the switch SW. The output terminals 15 and 17 of the rectifier RX are connected to the load conductors LO1 and LO2 through a reactor AZ of relatively small dimensions. With a voltage of about 70 R. M. S. at secondary S the voltage at conductors LO1 and LO2 has a mean magnitude of about 60 volts.

Specifically, for welding apparatus having a 200 ampere rating, this reactor AZ has a three legged core 31 made up of E-punchings and I-punchings. The E-punchings and I-punchings preferably used are identified as Westinghouse Electric Corporation Style Nos. 1600206 and 1600207, respectively. The center leg 33 of the core has a cross section of 1¾ inches by 2⅝ inches and the outer legs 35 and 37 a cross section of half the area of the center leg cross section. The I-punching assembly is mounted so that there is an air gap 39 of about .010 inch in each leg. The winding 41 of the reactor AZ is made up of 30 turns of insulated rectangular copper wire, each turn consisting of two wires in parallel and each wire being .081 inch by .204 inch. Similar reactors may be used at other current ratings.

Figure 3:
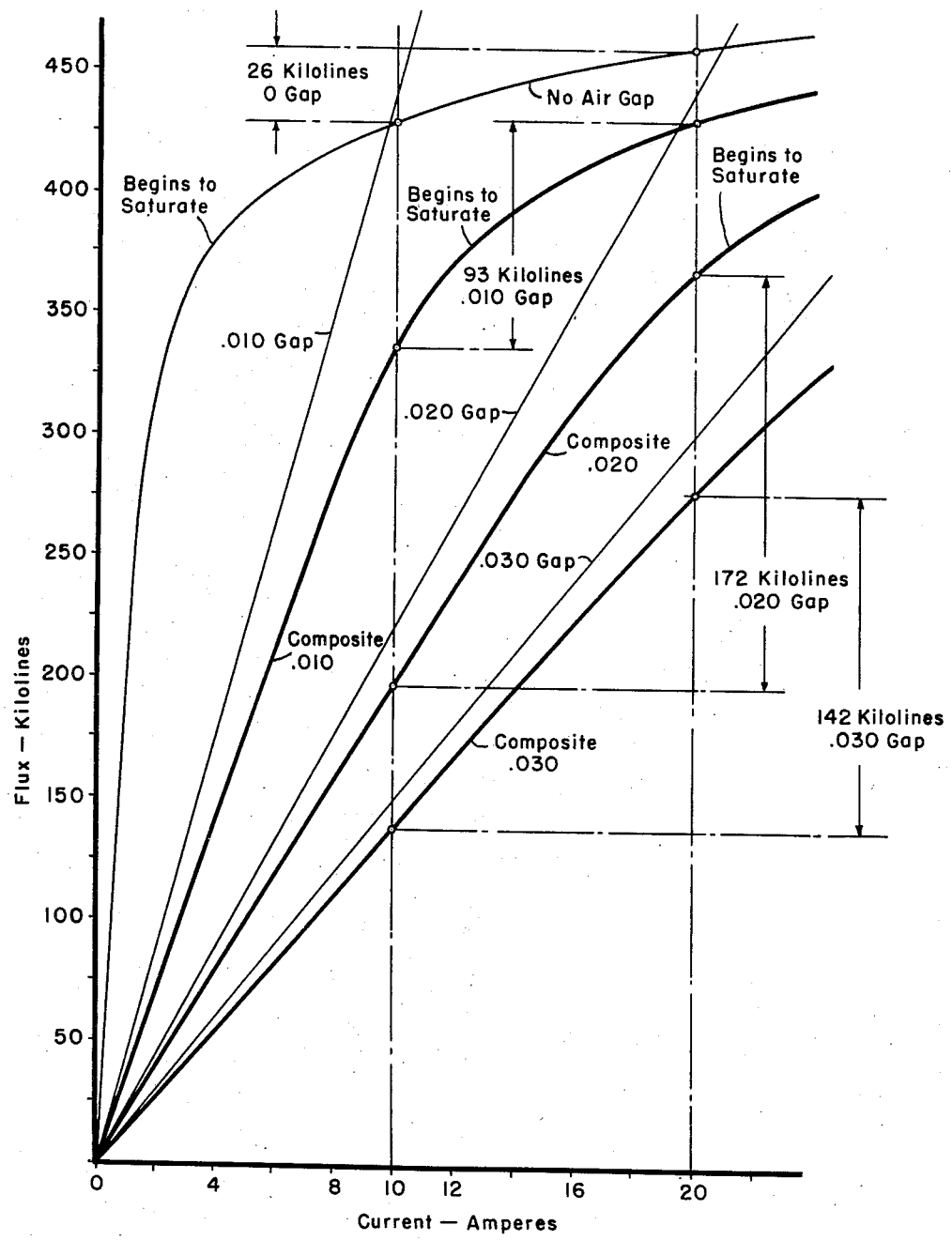
Fig. 3 is a graph showing the effect of air gap length on the magnetization curve of the magnetic material in reactors in accordance with our invention.

The magnetic characteristics of a reactor of this type and of related reactors are presented in Fig. 3. In this view, magnetic flux is plotted vertically and the current through the winding horizontally. For the air gap alone the flux plotted as a function of the current through the coil is a straight line. Such straight lines corresponding to air gaps of .010 inch, .020 inch and .030 inch are presented in Fig. 3. The slope of the line is seen to decrease as the air gap length increases. The air gap length which appears in Fig. 3 is the total air gap through which the flux must flow; that is twice the actual air gap between each leg 35 and 37 and the leg 31. For the iron alone, the flux plotted as a function of current is the usual saturation curve which has a knee at a current of the order of 4 amperes. The plots of the combined effects of the air gaps and the magnetic material; that is, the magnetization curves for reactors with cores having the different air gaps, are the heavy line curves labelled to indicate the air gap lengths to which they correspond. Each of these curves is a saturation curve which tends to follow the air gap curve at low currents and the solid magnetic material curve at high currents passing continuously from one to the other. It is seen that the composite curve for .010 air gap has its knee at 12.7 amperes and the curve for .020 has its knee at about 21 amperes. The change of flux for a variation in current from 20 amperes to 10 amperes is shown in Fig. 3. This change in flux measures the voltage developed at the arc as the current through the reactor is decreasing and thus the efficacy of the reactor in maintaining the arc. It is seen that for the solid material the change is only 26,000 lines, for the .010 air gap reactor 93,000 lines, for the .020, 172,000 lines and for the .030, 142,000 lines. Thus the maximum energy transfer takes place for a total air gap of about .020 inch or an air gap of .010 inch between each leg 35 and 37 and the core section 31 and we have found that such a gap produces highly satisfactory results. The reactor used in the apparatus in accordance with our invention then begins to saturate at a current of the order of 20 (21) amperes. We have found such a reactor to provide satisfactory arc stability over a wide range of welding current.

Figure 4:
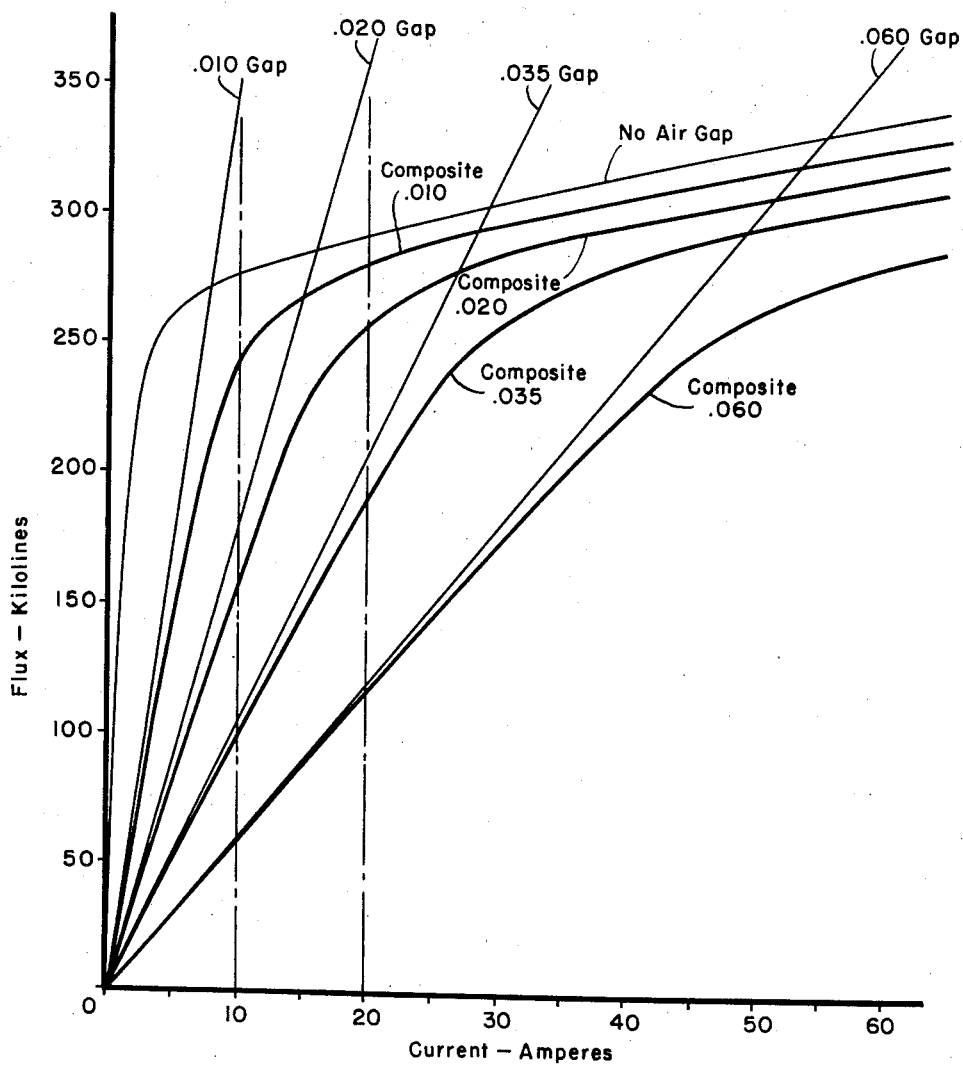
Fig. 4 is a graph similar to Fig. 3 for the magnetic material of another reactor in accordance with our invention.

A set of curves similar to that shown in Fig. 3 is shown in Fig. 4 for another reactor. In this case the I-punchings are again Westinghouse Style 1600207 and the E-punchings Style 1600206. But the center leg 33 has an area of 3 square inches and the outer legs 35 and 37 half this area and there are 34 turns rather than 30 turns of the wire described above.

To determine the proper air gap we produced welds with the reactor described above with the core set at different air gap lengths. These welds were produced with Westinghouse Electric Corp. type AP (AWS Class E–6010) electrodes of ⅛ inch and 3/32 inch diameter and with ordinary mild steel work. The potential impressed across the primary P was 209 volts R. M. S. and the open circuit voltage between the electrode and the work was 51 volts. In each case the welding current for the ⅛ inch electrode was 60 amperes and for the 3/32 inch electrode 45 amperes. With the core having the minimum air gap obtainable the arc outages occurred so frequently that the welding was unsatisfactory for the electrodes of both diameters. With an air gap of .010 inch there were a number of arc outages for the electrodes of both diameter. With an air gap of .020 inch there were no arc outages for either electrode and the welding was highly satisfactory. With an air gap of .040 inch the results were the same as for the .020 inch air gap. It is seen that with the air gap of the order of .020 inch (.010 inch each between 35 and 37 and 31) satisfactory operation is produced. The advantage of this gap can be seen from Fig. 3 which shows that the highest change of flux between 10 and 20 amperes is produced for the .020 gap.

In the use of the apparatus in accordance with our invention, one of the conductors LO2 is connected to the electrode E and the other conductor to the work W. As shown in the drawing, the negative conductor LO1 is connected to the electrode E and the positive LO2 to the work W, but these connections may be reversed. When a weld is to be produced the electrode E is touched to the work W and then removed from the work. An arc is then struck between the electrode and the work. The arc is struck when the potential derivable from the output terminals of the rectifier RX is sufficiently high. Once the arc is struck the current flow is dependent on the saturation condition of the reactor AZ. During the intervals during which the reactor is saturated, the drop across the reactor is small and the current flow between the electrode and the work is substantially independent of the reactor. During the intervals during which the reactor tends to become unsaturated, the reactor, because of the magnetic energy stored in its core, functions as a source and supplies current to maintain the arc.

Figure 5:
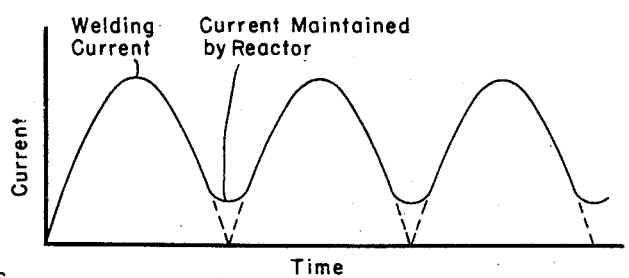
Fig. 5 is a graph presenting the mode of operation of our invention.

This is illustrated in Fig. 5 in which current is plotted vertically and time horizontally. The full-line half-waves with the broken line tips represent the arc current as a function of time in apparatus in which the reactor RX is not included. The effect of the reactor is presented by the full-line shallow curves which join the current curves in the region of the tips. These shallow curves correspond to sufficient current to maintain the arc. Thus, with a small reactor with proper proportions of turns, iron section and air gap, the apparatus operates continuously without interruption.

The apparatus shown in Fig. 1 serves readily for both direct current and alternating current welding. The open circuit voltage of the secondary S of the order of 70 volts is adequate for alternating-current welding. The direct-current voltage of 60 volts produced at the output terminals LO1 and LO2 also is adequate for direct-current welding.

While we have shown and described a specific embodiment of our invention, many modifications thereof are possible. Our invention, therefore, is not to be restricted except insofar as is necessitated by the spirit of the prior art.

We claim as our invention:

1. Arc welding apparatus comprising a pair of load conductors to be connected to a welding electrode, a plurality of single-phase alternating-current power supply conductors, a rectifier means connected to said supply conductors and having output terminals from which direct curernt is derivable and means including a reactor connecting said output terminals to said load conductors, the said apparatus being characterized by a reactor of such small dimensions that it begins to saturate at a current of between 10 and 30 amperes.

2. Arc welding apparatus according to claim 1 having a rating of the order of 200 amperes characterized by a reactor which begins to saturate at a current of the order of 20 amperes.

3. Apparatus according to claim 1 characterized by the fact that the rectifier means is of the full-wave type and is connected to the power supply conductors through a transformer having primary winding means and secondary winding means, said secondary winding means impressing 70 volts R. M. S. open circuit voltage across said rectifier means when rated voltage is impressed across said primary winding means.

4. Apparatus according to claim 3 characterized by a variable reactor connected between the secondary winding means and the rectifier means for varying the welding current.

5. Apparatus according to claim 1 characterized by a reactor having an air gap such that the reactor begins to saturate within the desired range of 10 to 30 volts.

6. Arc welding apparatus comprising a pair of load conductors to be connected to a welding electrode, a plurality of single-phase alternating-current power supply conductors, a rectifier means connected to said supply conductors and having output terminals from which direct current is derivable and means including a reactor connecting said output terminals to said load conductors, the said apparatus being characterized by a reactor of small dimensions, said reactor having a core with an air gap such that when the current therethrough decreases from 20 amperes to 10 amperes the change in flux through said core is substantially a maximum as compared to reactors with cores having greater or smaller air gaps.

References Cited in the file of this patent

UNITED STATES PATENTS

| | | |
|---|---|---|
| 1,146,988 | Arendt | July 20, 1915 |
| 1,720,662 | Burke | July 16, 1929 |
| 1,959,513 | Weyandt | May 22, 1934 |
| 2,255,141 | Weir | Sept. 8, 1941 |